Patented July 22, 1952

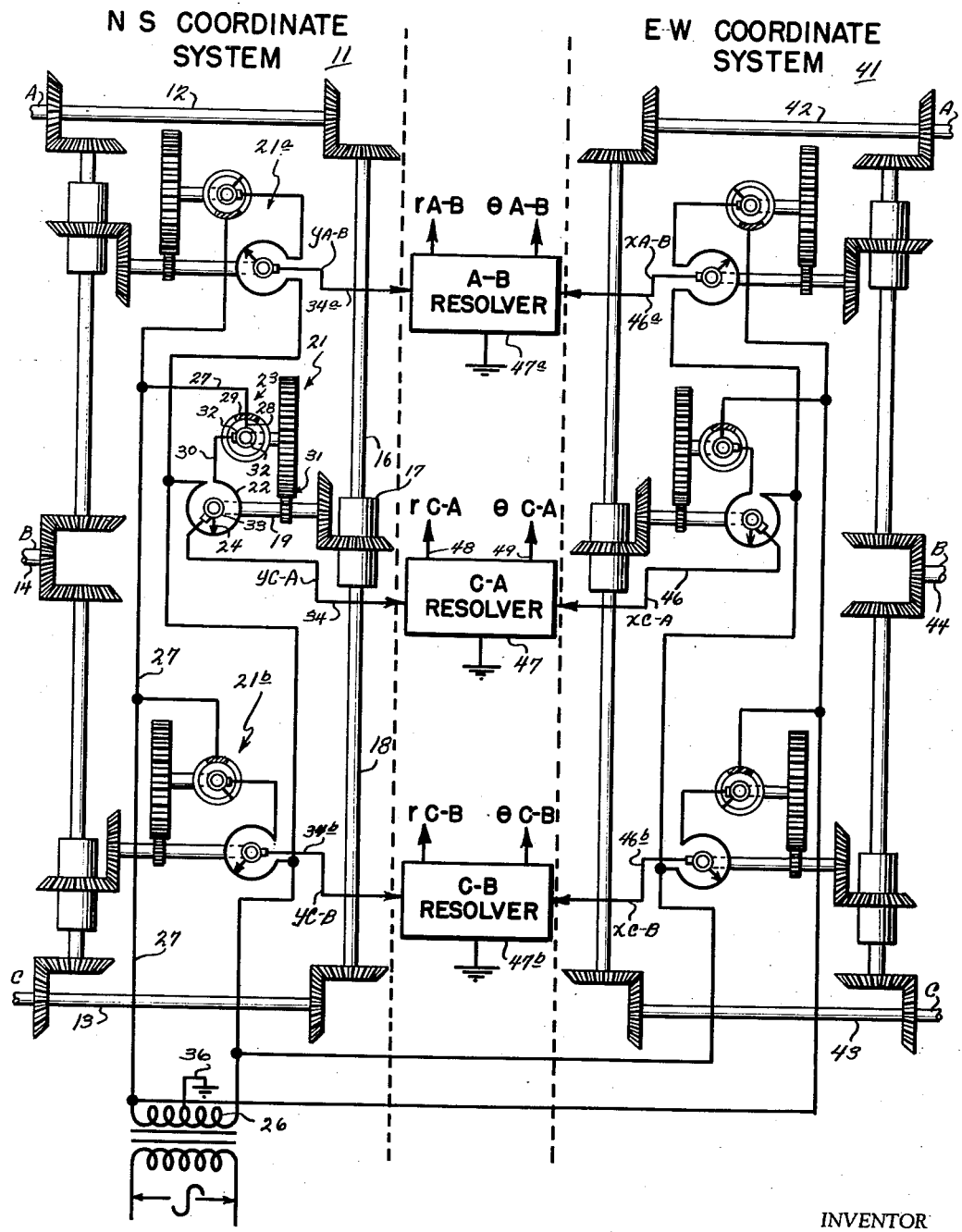

2,603,883

UNITED STATES PATENT OFFICE 2,603,883

POSITION SIMULATING APPARATUS FOR RADAR TRAINERS

John Donahue, San Diego, Calif.

Application June 30, 1949, Serial No. 102,182

5 Claims. (Cl. 35—10.4)

(Granted under the act of March 3, 1883, as amended April 30, 1928; 370 O. G. 757)

This invention relates to radar trainers or simulators.

In the training of radar operators, there have been used in the past devices which simulate radar operation. These devices are controlled by an instructor while the student views the radar screen and attempts to interpret the appearance of the screen in the proper tactical terms. The teacher has under his control suitable input levers and switches, so that he may insert into the radar training device a given course and speed for "own ship," i. e. the ship on which the training radar is supposed to be installed, as well as the courses and speeds of a number of "target ships" representing other ships in the vicinity of own ship. It is the function of the training device to cause the radar screen to appear just as it would in real life, if own ship were moving at the given course and speed, and if the targets were also moving at their given course and speed.

One limitation in radar training apparatus thus described is the finite boundaries which must be assigned to the mythical ocean over which the simulated ships operate. This is necessary in order that the signals put into the radar screen may be established in proper relation to each other and may be maintained in that proper relation at all times. The basic problem in such a radar trainer is to create, by suitable mechanism, pairs of voltages corresponding to the relative position between own ship and each of the target ships. The first of each pair of voltages is a signal representing the range between own ship and the specified target, while the second of each pair is a signal corresponding to the azimuth angle between own ship and the target ship.

For a problem to continue with reasonable continuity, it is necessary that the theoretical ocean be rather extensive. At the same time, the theoretical range of the radar being simulated is limited in magnitude to a range considerably less than that of the total ocean being simulated. In general, it is necessary in such radar simulators to create, or pick off, a voltage which is proportional to the distance separating two ships. To create mechanism for this purpose, it is customary to establish a potentiometer, the total voltage across which corresponds to the total length or breadth of the finite ocean. When, however, only a portion of this voltage is employed to simulate the actual radar range, any inaccuracy in operation is greatly magnified percentage-wise.

It is accordingly an object of this invention to provide a radar simulating trainer having a radar range appreciably less than the magnitude of the ocean, without sacrificing accuracy of presentation of radar information.

It is another object of this invention to achieve accuracy of presentation, as above stated, in a radar simulator in which any of the several ships simulated on the radar screen may become an "own ship."

Other objects and many of the attendant advantages of this invention will be readily appreciated as the same becomes better understood by reference to the following detailed description, when considered in connection with the accompanying drawing, wherein:

The single drawing is a circuit diagram partly schematic illustrating the principles underlying the instant invention.

Referring to the figure, 11 designates a north-south coordinate system, having a plurality of shafts, for example, three shafts 12, 13, and 14. The rotational position of shaft 12 is proportional at any instant to the north-south, or Y, component of one of three ships, A, on a simulated ocean. Similarly, shaft B is positioned in accordance with the Y component, on the simulated ocean, of the position of a ship B; and shaft 13 is positioned by the Y component of position of a ship C. Shaft 12 is connected, by a connection shown schematically at 16, to a mechanical differential apparatus 17, which is also fed by a connection 18 in accordance with the position of the shaft 13. The apparatus 17 may be any known device for accepting two shaft position inputs 16 and 18, and producing therefrom, at its output shaft 19, the difference between the position of the two input shafts. That is to say, if shafts 12 and 13 are both rotating in the same angular direction with the same angular velocity, then there will be no output from the device 17, i. e. shaft 19 will be stationary. Again if shaft 13 is stationary, and shaft 12 is rotating at a velocity corresponding to 10 knots north, then shaft 19 will be caused to rotate with a velocity corresponding to 10 knots north. And by way of final example, if shaft 12 is rotating with a velocity corresponding to a speed of 10 knots north and shaft 13 is rotating with a velocity corresponding to 5 knots south, then shaft 19 will rotate with a velocity corresponding to 15 knots north.

In order to utilize the information embodied in the unique position, at any instant, of the output shaft 19, it is necessary to translate that position into terms of a voltage. This is done through a potentiometer system 21, consisting of two principal elements, a potentiometer 22 and a switch 23, both of which are connected to be actuated in a particular fashion, to be described hereinafter, from the shaft 19.

The shaft 19 is connected mechanically to rotate a potentiometer slider 24, which is capable of continuous rotation around and against the potentiometer element 22, the latter being made in the form of a circle. That is to say, relative continuous rotation for more than one full revolution, in fact in this case, for eleven revolutions, is possible between the potentiometer element 22 and its associated slider 24. Across the two terminals of the potentiometer 22 is connected a source of alternating voltage 26, one of the connecting leads 27—30 having in series therewith the above-mentioned switch 23.

In the embodiment illustrated, the switch 23 assumes the form of a rotating slider member 28 and an arcuate, stationary contact member 29. Slider 28, like slider 24, is driven from the shaft 19, through a step-down gearing arrangement 31 having a ratio of 1 to 6. The slider 28 is connected to one side of the potentiometer 22 through a suitable slip ring 32, while the segmental contact member 29 is connected to the voltage supply lead 27. By a slip-ring connection 33, an output lead 34 is connected to the slider 24 which rides on the potentiometer 22.

The operation of the potentiometer system 21 will now be briefly described with reference to the following exemplary numerical example. Suppose that the simulated ships A and C are both at the same north-south position or latitude, i. e. have the same magnitude of Y component on the simulated ocean. Under such circumstance, the slider 24 will be at the midpoint of the potentiometer 22, as illustrated in the drawing; and the slider 28 will be at the midpoint of the arcuate segment 29. Under this circumstance, the potential on the output lead 34 will be at ground, or zero, inasmuch as the center point of the voltage supply 26 is grounded as shown at 36.

Let us assume further that both the ships A and C are at the middle of the simulated ocean, which has a north-south dimension of 2200 miles. Assume now that ship A moves northward, while ship C remains stationary. The slider 24 then rotates clockwise, while the slider 28 revolves in a counter-clockwise direction with only one-sixth of the angular velocity of the former because of the 6 to 1 stepdown in the gearing 31. When the slider 24 has reached the electrical extreme of its travel, i. e. the connection point for the lead 30, the slider 28 will be at the extreme clockwise edge of the contact segment 29. Under this circumstance, maximum voltage of phase representing "north" is being applied to the output lead 34 of the potentiometer system 21.

Further clockwise movement of the slider 24, i. e. further northward movement of the ship A, moves the slider 24 onto the "south" or counter-clockwise half of the potentiometer 22, since continuous relative rotation is possible with this potentiometer. This would normally be expected to apply a "south" phase voltage to the output lead 34, which would obviously be incorrect, except that at this moment the slider 28 parts from the contact segment 29, opening the circuit and causing no voltage at all to appear on the output lead 34. This simply indicates that the ships A and C have separated beyond radar range, which in this example is assumed to be 100 miles.

Despite the opening of the switch 23, representing passage beyond radar range, the ship A may still proceed another 1000 miles north of the ship C to the extreme northern edge of the simulated ocean. During this movement, the slider 28 continues to rotate in a counter-clockwise direction, but because of the step-down gearing 31, has not come around again to the contact segment 29, although the slider 24 will have passed several times around the potentiometer 22. Should the ship A now return southward, or the ship C proceed northward, which would amount to the same thing relatively, the sliders 24 and 28 rotate counter-clockwise and clockwise respectively at their respective angular velocities until radar range, i. e. 100 miles, is again attained between them, at which point the slider 28 is brought into contact with the segment 29, and the appropriate range output signal voltage appears on the output lead 34.

A corresponding operation occurs if the ship A moves south of the ship C, except that the operation of the sliders 24 and 28 would be counter-clockwise and clockwise respectively, and the voltages applied to the output lead 34 would be reversed in phase.

The voltage appearing on the output lead 34 therefore represents the Y component of relative position between A and C.

By similar potentiometer systems 21a and 21b, the relative north-south, or Y, components between A and B, and between B and C, respectively, may be applied to the respective output leads 34a and 34b.

Referring now to the right hand side of the figure, 41 represents a system identical to that described hereinbefore with respect to the numeral 11, except that the inputs to the shafts 42, 43, and 44 correspond to the east-west, or X, component of position of the three ships, A, B, C, respectively. In a manner similar to that described hereinbefore, there is caused to appear on the output lead 46 a voltage proportional to the X component of relative position between ships C and A; and on output lead 46a, a voltage proportional to the X component between A and B; and on 46b proportional to the X component between C and B.

The output leads 34 and 46 are connected to a suitable device 47, well known in the art, for transforming the Y and X components between C and A into a range component appearing on the output lead 48, and an azimuth angle component appearing on the output lead 49. Suitable devices are described in Patents Nos. 2,465,624, 2,467,646 to Agins. The component converter 47 is simply a device for transforming orthogonal, or Cartesian, coordinates into polar coordinates; such devices are well known in the electrical art and any suitable device of that sort may be used. Similar component converters 47a and 47b are employed to transfer the X—Y components into range-azimuth components for A—B and C—B, respectively.

By the use of the potentiometer system 21, as described above, it is possible to employ a simulated ocean of much larger dimension than the simulated radar range, while still retaining accuracy of presentation within the radar range, which is the only time during which an output voltage is desired anyway. Without the use of the switch means 23, it would be necessary for the voltage drop around the potentiometer 22 to correspond to 2200 miles instead of to 200 miles, as is the case with the instant invention. With the use of the instant invention, it is clear that a much greater potentiometer sensitivity in terms of volts per mile may be achieved by the employment of the potentiometer system 21.

It will be seen that the instant system provides an infinite ocean in which own ship may move in any direction, limited only by the requirement that none of the targets may exceed a predetermined range from own ship.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed is:

1. Position-indicating apparatus comprising a pair of substantially identical systems; one, a north-south system; the other, an east-west system; each system comprising three shafts, each positioned in accordance with the position of a movable object to be simulated, three differential units interconnected between said three shafts and positioned thereby in accordance with the respective difference in position between each of the three shafts and the other two shafts, and a potentiometer system connected to each unit and effective to deliver an electrical output proportional to the positions on the corresponding unit; each potentiometer system consisting of a circular potentiometer, a first slider riding on said potentiometer, said potentiometer and said slider being mounted for relative continuous rotation with respect to each other, a source of voltage, electrical leads connecting said potentiometer across said source whereby a voltage drop exists around said potentiometer, an electrical output lead connected to said slider, a contactor segment, a second slider, said segment and second slider being mounted for relative movement with said segment and said second slider making electrical contact during only a portion of their relative movement, driving means connected to relatively rotate said potentiometer and said first slider, and to relatively move said segment and said second slider, said segment and second slider being in contact during one revolution between said potentiometer and first slider, and circuit means connecting said segment and second slider in series with one of said leads, whereby no output voltage appears except when said segment and second slider are in contact; the shafts in the north-south system being positioned in accordance with the north-south coordinates of the positions of said objects, the shafts in the east-west system being positioned in accordance with the east-west coordinates of the positions of said objects; three component converters corresponding to the three differential units in the system effective to translate north-south and east-west coordinates into polar coordinates; and circuit means connecting each component converter to the corresponding output leads in each system.

2. Position-indicating apparatus comprising a pair of substantially identical systems; one, a north-south system; the other, an east-west system; each system comprising three shafts, each positioned in accordance with the position of a movable object to be simulated, three differential units interconnected between said three shafts and positioned thereby in accordance with the respective difference in position between each of the three shafts and the other two shafts, and a potentiometer system connected to each unit and effective to deliver an electrical output proportional to the positions on the corresponding unit; each potentiometer system consisting of a circular potentiometer, a first slider riding on said potentiometer, said potentiometer and said slider being mounted for relative continuous rotation with respect to each other, a source of voltage, electrical leads connecting said potentiometer across said source whereby a voltage drop exists around said potentiometer, an electrical output lead connected to said slider, a contactor segment, a second slider, said segment and second slider being mounted for relative movement with said segment and said second slider making electrical contact during only a portion of their relative movement, driving means connected to relatively rotate said potentiometer and said first slider, and to relatively move said segment and said second slider, said segment and second slider being in contact during one revolution between said potentiometer and first slider, and circuit means connecting said segment and second slider in series with one of said leads, whereby no output voltage appears except when said segment and second slider are in contact.

3. Position indicating apparatus comprising a pair of substantially identical systems, one a north-south system, the other an east-west system; each system comprising a plurality of shafts each positioned in accordance with the position of a movable object to be simulated; differential units interconnected between each said shaft and positioned thereby in accordance with the difference in position between the several interconnected shafts; and a potentiometer system connected to each unit and effective to deliver an electrical output proportional to the position of the corresponding unit; each potentiometer system consisting of a circular potentiometer, a first slider riding on said potentiometer, said potentiometer and said slider being mounted for relative continuous rotation with respect to each other, a source of voltage, electrical leads connecting said potentiometer across said source whereby a voltage drop exists around said potentiometer, an electrical output lead connected to said slider, a contactor segment, a second slider, said segment and second slider being mounted for relative movement with said segment and said second slider making electrical contact during only a portion of their relative movement, driving means connected to the corresponding differential unit to relatively rotate said potentiometer and said first slider, and to relatively move said segment and said second slider, said segment and second slider being in contact during one revolution between said potentiometer and first slider, and circuit means connecting said segment and second slider in series with one of said leads, whereby no output voltage appears except when said segment and second slider are in contact; the shafts in the north-south system being positioned in accordance with the north-south coordinate of the position of said object, the shafts in the east-west system being positioned in accordance with the east-west coordinate of the position of said object; a plurality of component converters, corresponding to the differential units in the systems and effective to translate north-south and east-west coordinates into polar coordinates, and circuit means connecting each component converter to the corresponding output leads in each system.

4. Position indicating apparatus comprising a pair of substantially identical systems, one a north-south system, the other an east-west system; each system comprising a plurality of shafts each positioned in accordance with the position of a movable object to be simulated; differential units interconnected between each said shaft and positioned thereby in accordance with the difference in position between the several interconnected shafts; and a potentiometer system connected to each unit and effective to deliver an electrical output proportional to the position of the corresponding units; each potentiometer system consisting of a circular potentiometer, a first slider riding on said potentiometer, said potentiometer and said slider being mounted for relative continuous rotation with respect to each other, a source of voltage, electrical leads connecting said potentiometer across said source whereby a voltage drop exists around said potentiometer, an electrical output lead connected to said slider, a contactor segment, a second slider, said segment and second slider being mounted for relative movement with said segment and said second slider making electrical contact during only a portion of their relative movement, driving means connected to the corresponding differential unit to relatively rotate said potentiometer and said first slider, and to relatively move said segment and said second slider, said segment and second slider being in contact during one revolution between said potentiometer and first slider, and circuit means connecting said segment and second slider in series with one of said leads, whereby no output voltage appears except when said segment and second slider are in contact.

5. In a training device, a first shaft having an angular position representing a coordinate of the position of a first object, a second shaft having an angular position representing the corresponding coordinate of the position of a second object, a differential unit interconnecting said first and second shafts and actuating a third shaft to an angular position representing the difference between said first and second shafts, a rotatable switch comprising a rotatable brush, step-down gearing connecting said third shaft to said rotatable brush, a conducting segment adapted to be engaged by said rotatable brush over an arcuate length equal to the movement of said brush in one revolution of said third shaft, a potentiometer having a rotatable arm driven by said third shaft and a circular resistance element connected in series with said rotatable switch, means connecting said switch and resistance element to a source of electrical voltage whereby a voltage may be tapped off by said rotatable arm, said tapped voltage being a measure of the difference in coordinates between said first and second objects.

JOHN DONAHUE.

REFERENCES CITED

The following references are of record in the file of this patent:

UNITED STATES PATENTS

| Number | Name | Date |
| --- | --- | --- |
| 2,096,450 | Curtis | Oct. 19, 1937 |
| 2,417,442 | Parkinson | Mar. 18, 1947 |
| 2,439,169 | Kittredge | Apr. 6, 1948 |
| 2,448,885 | Hooven | Sept. 7, 1948 |
| 2,471,315 | Dehmel | May 24, 1949 |
| 2,472,129 | Streeter | June 7, 1949 |
| 2,476,746 | Libman | July 19, 1949 |